United States Patent
Lymberopoulos

(10) Patent No.: US 9,163,619 B2
(45) Date of Patent: Oct. 20, 2015

(54) VALVE ACTUATOR CONTROL SYSTEM AND METHOD OF USE

(75) Inventor: David Lymberopoulos, Houston, TX (US)

(73) Assignee: SAFOCO, INC., Houston, TX (US)

( * ) Notice: Subject to any disclaimer, the term of this patent is extended or adjusted under 35 U.S.C. 154(b) by 967 days.

(21) Appl. No.: 13/234,993

(22) Filed: Sep. 16, 2011

(65) Prior Publication Data

US 2012/0073670 A1    Mar. 29, 2012

Related U.S. Application Data

(60) Provisional application No. 61/384,145, filed on Sep. 17, 2010, provisional application No. 61/497,470, filed on Jun. 15, 2011, provisional application No. 61/497,828, filed on Jun. 16, 2011.

(51) Int. Cl.
*F16K 31/42* (2006.01)
*F04B 23/00* (2006.01)
*F04B 49/03* (2006.01)
(Continued)

(52) U.S. Cl.
CPC .................. *F04B 23/00* (2013.01); *F04B 49/03* (2013.01); *F15B 20/00* (2013.01); *F16K 31/42* (2013.01); *F16K 37/0041* (2013.01); *Y10T 137/0324* (2015.04); *Y10T 137/85978* (2015.04)

(58) Field of Classification Search
CPC ..... F16K 31/406; F16K 31/383; F16K 31/42; F16K 31/423; F16K 31/426; F15B 2211/6336; F04B 23/04
USPC ............ 251/30.01, 129.04; 91/165, 166, 361, 91/462, 465; 60/375, 486
See application file for complete search history.

(56) References Cited

U.S. PATENT DOCUMENTS 3,425,218 A * 2/1969 Attebo ............................ 60/486
3,741,116 A   6/1973 Green et al.
3,788,341 A   1/1974 Athy, Jr. et al.
(Continued)

FOREIGN PATENT DOCUMENTS

EP      0 647 770       4/1995
JP      07-042856 A     2/1995
WO      WO 02/25612     3/2002

OTHER PUBLICATIONS

PCT Search Report and Written Opinion for International Application No. PCT/US2011/052027 dated Apr. 19, 2012.
(Continued)

*Primary Examiner* — Kevin Murphy
(74) *Attorney, Agent, or Firm* — Patterson & Sheridan, L.L.P.

(57) ABSTRACT

A valve actuator control system for use with a valve actuator may include two pump assemblies, two control valve assemblies, two transducers, a fluid reservoir, and a controller assembly. The controller assembly may actuate the pump assemblies to direct fluid from the fluid reservoir to the valve actuator, and may actuate the control valve assemblies to direct fluid from the valve actuator to the fluid reservoir. A method of actuating a valve actuator using a valve actuator control system may comprise sending a signal to the valve actuator control system, injecting pressurized fluid from a fluid reservoir of the valve actuator control system into a first chamber of the valve actuator, discharging pressurized fluid from a second chamber of the valve actuator into the fluid reservoir, and actuating the valve actuator from a first position to a second position.

5 Claims, 4 Drawing Sheets

(51) Int. Cl.
*F15B 20/00* (2006.01)
*F16K 37/00* (2006.01)

(56) References Cited

U.S. PATENT DOCUMENTS

| | | | |
|---|---|---|---|
| 4,213,480 A | | 7/1980 | Orum et al. |
| 4,461,449 A | | 7/1984 | Turner |
| 4,527,429 A | | 7/1985 | Combest et al. |
| 4,548,296 A | * | 10/1985 | Hasegawa ............... 187/275 |
| 4,667,570 A | | 5/1987 | Jensen, Jr. et al. |
| 5,046,397 A | * | 9/1991 | Ezell et al. ............... 91/167 R |
| 5,097,857 A | | 3/1992 | Mayhew |
| 5,132,904 A | | 7/1992 | Lamp |
| 5,273,113 A | | 12/1993 | Schultz |
| 5,275,086 A | | 1/1994 | Stallings, Jr. |
| 5,335,730 A | | 8/1994 | Cotham, III |
| 5,363,816 A | * | 11/1994 | Yorita et al. ............. 123/90.12 |
| 5,381,654 A | * | 1/1995 | Halin .......................... 60/226.2 |
| 5,490,564 A | | 2/1996 | Schultz et al. |
| 5,526,883 A | | 6/1996 | Breaux |
| 6,109,161 A | * | 8/2000 | Shimada et al. ................ 91/40 |
| 6,349,772 B2 | | 2/2002 | Mullen et al. |
| 6,412,510 B1 | | 7/2002 | Johnson |
| 6,435,282 B1 | | 8/2002 | Robison et al. |
| 6,450,477 B1 | | 9/2002 | Young |
| 6,524,691 B2 | * | 2/2003 | Sugawara et al. .......... 428/292.4 |
| 6,662,705 B2 | * | 12/2003 | Huang et al. .................... 91/433 |
| 6,772,718 B2 | | 8/2004 | Allen |
| 6,848,255 B2 | * | 2/2005 | Chiaramonte ................ 60/456 |
| 6,854,704 B1 | | 2/2005 | Young |
| 7,004,445 B2 | | 2/2006 | Lymberopoulos |
| 7,086,358 B2 | * | 8/2006 | Panciroli ................... 123/90.12 |
| RE39,583 E | | 4/2007 | Upchurch |
| 7,231,971 B2 | | 6/2007 | McCalvin |
| 2002/0112632 A1 | | 8/2002 | Faibish |
| 2002/0124889 A1 | | 9/2002 | Sundararajan |
| 2004/0011192 A1 | * | 1/2004 | Frediani et al. ................ 91/459 |
| 2005/0087712 A1 | | 4/2005 | Lymberopoulos |
| 2005/0236594 A1 | | 10/2005 | Lilly et al. |
| 2006/0159569 A1 | | 7/2006 | Biester |
| 2010/0154894 A1 | | 6/2010 | Kotapish et al. |
| 2011/0036415 A1 | | 2/2011 | Lymberopoulos |
| 2011/0094752 A1 | | 4/2011 | Hudson et al. |
| 2011/0240126 A1 | | 10/2011 | Lymberopoulos et al. |
| 2013/0008519 A1 | | 1/2013 | Crawford |

OTHER PUBLICATIONS

Versa Series B Valves Bulletin B-2011; Versa Products Company, Inc.; 2011, 8 Pages.
Rotowink Indicators; Norgren 1996; 2 Pages.

* cited by examiner

VALVE ACTUATOR CONTROL SYSTEM AND METHOD OF USE

CROSS-REFERENCE TO RELATED APPLICATIONS

This application claims benefit of U.S. provisional patent application Ser. No. 61/384,145, filed Sep. 17, 2010; U.S. provisional patent application Ser. No. 61/497,470, filed Jun. 15, 2011; and U.S. provisional patent application Ser. No. 61/497,828, filed Jun. 16, 2011. Each of these applications is incorporated herein by reference in its entirety.

BACKGROUND OF THE INVENTION

1. Field of the Invention

Embodiments of the invention generally relate to systems and methods for controlling a valve from a remote location. Particularly, embodiments of the invention relate to a self-contained control system for hydraulically actuating a valve actuator, the self-contained control system operable via a remote control device. More particularly, embodiments of the invention relate to a remotely operated, self-contained control system for operating a double acting hydraulic valve actuator to open and close a valve.

2. Description of the Related Art

Multiple valves may be used to control the flow of fluids though widespread and complex pipeline systems. Fluids can be directed to various locations by opening and closing the valves, thereby opening and closing certain fluid circuits of the pipeline system. These valves may be physically located miles apart from each other and may require manual operation to open and close the valves. An extensive amount of time and energy is required to direct and re-direct fluid through the pipeline system using manually operated valves.

Valves are also used as part of wellhead systems that control the flow of fluid to and from an underground reservoir to conduct various wellbore operations. One such operation is known as a hydraulic fracturing operation, during which extremely high pressure fluid is supplied downhole to fracture the reservoir. During the fracturing operation, the area surrounding the wellhead system and the wellhead valves may be subjected to dangerously high levels of pressure. It may be necessary, however, to operate the valves at some point during the fracturing operation. Remote communications may be limited or restricted in the operating field during such type of wellbore operations, thereby requiring manual operation of the wellhead valves and subjecting the valve operators to the dangerous environment.

Therefore, there is a need for new and improved valve control systems and methods that are self reliant and can be remotely operated using minimal remote communication when desired.

SUMMARY OF THE INVENTION

In one embodiment, a valve actuator control system for use with a valve actuator may comprise a first and second pump assembly; a first and second control valve assembly; a fluid reservoir in communication with the pump assemblies and the control valve assemblies; and a controller assembly operable to actuate the pump assemblies to direct fluid from the fluid reservoir to the valve actuator, and operable to actuate the control valve assemblies to direct fluid from the valve actuator to the fluid reservoir.

In one embodiment, a method of actuating a valve actuator using a valve actuator control system may comprise injecting pressurized fluid from a fluid reservoir of the valve actuator control system into a first chamber of the valve actuator; discharging pressurized fluid from a second chamber of the valve actuator into the fluid reservoir; and actuating the valve actuator from a first position to a second position.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
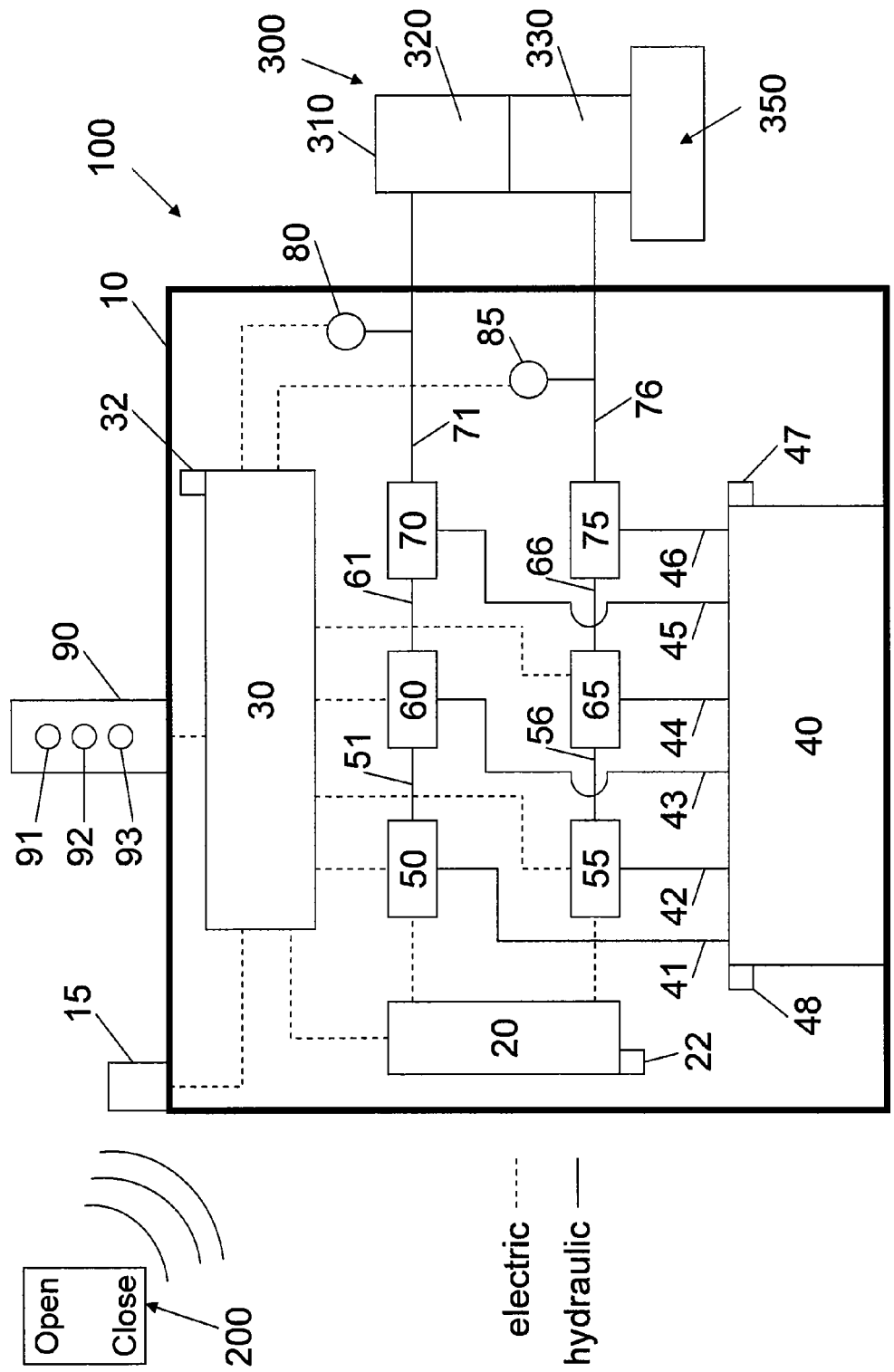
FIG. 1 illustrates a valve actuator control system according to one embodiment.

FIG. 1 illustrates a valve actuator control system 100 for a valve actuator 300 according to one embodiment. The valve actuator control system 100 may be remotely operated via a remote control device 200 to actuate the valve actuator 300 to open and close a valve 350 that is connected to the valve actuator 300. Hydraulic fluid may be supplied from that valve actuator control system 100 to the valve actuator 300 to actuate the valve 350 upon receiving a signal from an operator via the remote control device 200 at a location remote from the valve 350.

The valve actuator control system 100 may be "self-contained," which means that it does not depend on any external pneumatic, hydraulic, mechanical, or electrical sources for its operation to actuate the valve actuator 300, with limited exception depending on various embodiments. One exception including a signal sent to the controller assembly 30 via the remote control device 200 and the receiver 15. Another exception including solar energy provided by the sun to re-charge and/or power the power source 20 according to one embodiment. In general, all of the operating fluids and mechanisms necessary to operate the valve actuator 300 are maintained within the valve actuator control system 100 to effectively open and close the valve 350 with minimal, if any, additional external dependency.

In one embodiment, the valve actuator control system 100 may include a housing 10, a receiver 15, a power source 20, a controller assembly 30, a fluid reservoir 40, a first and second pump assembly 50, 55, a first and second control valve assembly 60, 65, and a first and second relief valve assembly 70, 75. The valve actuator control system 100 may include a first and second transducer 80, 85, and an indication device 90. Numerous hydraulic and electric lines may provide communication between one or more components of the valve actuator control system 100 as described herein. Embodiments relating to the components of control system 200, including controller assembly 220 described and illustrated in at least FIG. 2 of U.S. Provisional Patent Application Ser. No. 61/370,721, entitled "Safety Valve Control System and Method of Use," filed Aug. 4, 2010, the disclosure of which is herein incorporated by reference in its entirety, may be used with the embodiments of the valve actuator control system 100 described herein.

In one embodiment, the housing 10 may include any structural support member, such as an explosion proof container, for protecting and supporting the components stored therein from damage and environmental elements. Appropriate ventilation of the housing 10 may be provided by ventilation holes and/or an independent solar powered fan mounted in or through the housing 10. The housing 10 may further include an access panel or door for ease of access to the housing's interior, and may be configured for attachment to any type of support structure, including the valve actuator 300 and the valve 350. One or more manifold assembles may be provided on the housing 10 for fluid and/or electrical connection between the housing 10 (and the components within the housing 10) and the valve actuator 300, the valve 350, the receiver 15, the indication device 90, and/or any other components external to the housing 10. In one embodiment, the structural components of the valve actuator control system 100, to the extent possible, may be made from stainless steel.

In one embodiment, the power source 20 may provide power to the receiver 15, the controller assembly 30, the first and second pump assemblies 50, 55, and/or the indication device 90. The power source 20 may be operable to provide a low current (amp) stream to these various components. In one embodiment, the power source 20 may include an intrinsically-safe battery, such as a 12 or 24 volt, direct current, explosion proof power supply. In one embodiment, the power source 20 may include a watchdog sensor 22 to communicate to an operator at a remote location via the controller assembly 30 a failure of the power source 20. The watchdog sensor 22 may also give an auditory or visual alarm to alert an operator onsite that the power source 20 is low and/or dead. The controller assembly 220 may be configured to automatically open and/or close the valve 350 upon receiving a signal from the watchdog sensor 22. In one embodiment, the power source 20 may be a (re-chargeable) power supply that is supported by a solar panel assembly. The solar panel assembly may include one or more solar panels connected to the exterior of the housing 10 to consume light energy from the sun to generate electricity. An intrinsically safe voltage controller may deliver electrical current at an appropriate voltage, 12 or 24 volts for example, to the power source 20, which in turn supplies power to the components of the valve actuator control system 100.

In one embodiment, the controller assembly 30 may be weather-proof, and may be intrinsically safe to provide power as necessary to one or more components of the valve actuator control system 100. In one embodiment, the controller assembly 30 may include a series of relays operable to open and close the necessary electrical connections between the valve actuator control system 100 components to facilitate actuation of the valve actuator 300 as described herein. In one embodiment, the controller assembly 30 may include first, second, and third relays, further discussed with respect to FIG. 2. The first relay may include a "latching" relay that is operable remain in a specific position without power flow until it is activated to move to another position. The first relay may be used to facilitate operation of the first and second control valve assemblies 60, 65, as further described below. The second and third relays may be used with the first and second transducers 80, 85 to facilitate operation of the first and second pump assemblies 50, 55, respectively, as further described below.

In one embodiment, the controller assembly 30 may include a programmable micro-processing unit having a display screen and a keypad operable to communicate with and control the valve actuator control system 100 components to actuate the valve actuator 300 as described herein. For example, the controller assembly 30 may include a programmable logic controller, including a supervisory control and data acquisition system (SCADA) that is in communication with the receiver 15, the power source 20, the first and second pump assemblies 50, 55, the first and second control valve assemblies 60, 65, the first and second transducers 80, 85, and/or the indication device 90. A current regulator may be used to provide low current transmission between the controller assembly 30 and the various components of the valve actuator control system 100. A watchdog sensor 32 may be used to monitor the operation of the controller assembly 30 and provide an alarm in the event of a failure.

In one embodiment, the controller assembly 30 may be operable to send and/or receive signals directly with the remote control device 200 and/or with the use of the receiver 15. The remote control device 200 may include a one-way or two-way remote control, and/or a computer system (such as a desktop computer, laptop computer, or personal digital assistant), which can be used at a remote location from the valve actuator control system 100. In one embodiment, signals may be sent and/or received between the controller assembly 30, the receiver 15, and/or the remote control system 200 via wired and/or wireless telemetry means, including but not limited to electrical wires, fiber optical cables, radio frequency, infrared, microwave, and/or laser light communication. In this manner, the valve actuator control system 100 can be monitored and operated remotely from one or more locations on-site or off-site relative to the valve actuator control system 100. In one embodiment, the valve actuator control system 100 may be configured for manual and/or remote operation on-site at the location of the valve actuator 300 and the valve 350. Manual operation may include a hand pump assembly to pump fluid from the fluid reservoir 40 to the valve actuator 300, and/or a manual override assembly to actuate the valve actuator 300, thereby opening and closing the valve 350. In one embodiment, the remote control device 200 may be wired directly to the valve actuator control system 100, and may be coupled to an exterior of or disposed within the housing 10 (or another structure/enclosure adjacent the valve actuator control system 100) for access to on-site remote operation.

In one embodiment, the fluid reservoir 40 may be configured to store an amount of operating fluid sufficient to actuate the valve actuator 300. In one embodiment, the fluid reservoir 40 may be configured to compensate for loss of fluid within the control valve system 100 that is used to actuate the valve actuator 300. The operating fluid may include air, water, propylene glycol, and other valve operating fluids known in the art. In one embodiment, the fluid reservoir 40 may include a level gauge 47, such as a sight glass, to indicate the level of fluid in the fluid reservoir 40. The fluid reservoir 40 may also include a level sensor 48 that is in communication with the controller assembly 30 and is operable to monitor in real-time the level of fluid in the fluid reservoir 40. In the event that the level of fluid falls below a pre-set limit, due to a small leak of the fluid for example, the level sensor 48 may provide an alarm to alert an operator on-site near the valve actuator control system 100 and/or at the remote location via the controller assembly 30 and the remote control device 200. The controller assembly 30 may automatically open or close that valve 350 upon receiving a signal from the level sensor 48.

In one embodiment, the first and second pump assemblies 50, 55 may include an intrinsically safe and/or explosion proof motor and a pump. The first and second pump assemblies 50, 55 may include positive displacement/rotary piston pumps with about a 100 to 10,000 psi range. In one embodiment, the first and second pump assemblies 50, 55 may be rated for about 200 psi to about 300 psi. In one embodiment, one or more of the components of the valve actuator control system 100 may be rated for up to about 2500 psi. The first and second pump assemblies 50, 55 may be configured to pump hydraulic and/or pneumatic fluid from the fluid reservoir 40 to the valve actuator 300 to operate the valve 350. In one embodiment, a single reversible pump assembly may be used to facilitate operation of the valve actuator 300 as described herein.

In one embodiment, the first and second control valve assemblies 60, 65 may include one or more intrinsically safe solenoid valves operable to control and direct communication between the first and second pump assemblies 50, 55, respectively, the fluid reservoir 40, and the valve actuator 300. In particular, the first and second control valve assemblies 60, 65 may be operable to open and close the fluid circuits between the first and second pump assemblies 50, 55, respectively, the fluid reservoir 40, and the valve actuator 300. The controller assembly 30 may be used to control operation (e.g. open and close) of the first and second control valve assemblies 60, 65 to thereby control actuation of the valve actuator 300 as desired.

In one embodiment, the first and second relief valve assemblies 70, 75 may include one or more pressure controlled shuttle valves operable to control and direct communication between the first and second pump assemblies 50, 55, respectively, the fluid reservoir 40, and the valve actuator 300. In particular, the first and second relief valve assemblies 70, 75 may be operable to open and close the fluid circuits between the first and second pump assemblies 50, 55, respectively, the fluid reservoir 40, and the valve actuator 300 to rapidly expel fluid from the valve actuator 300 to the fluid reservoir 40 to ensure rapid open and or closure of the valve 350. A pressure change in a fluid circuit that is in communication with the first and second relief valve assemblies 70, 75 may actuate the valve assemblies to open and/or close another fluid circuit, thereby allowing fluid pressure to flow into the valve actuator 300 and/or allowing quick relief of fluid pressure to flow out of the valve actuator 300.

Figure 3:
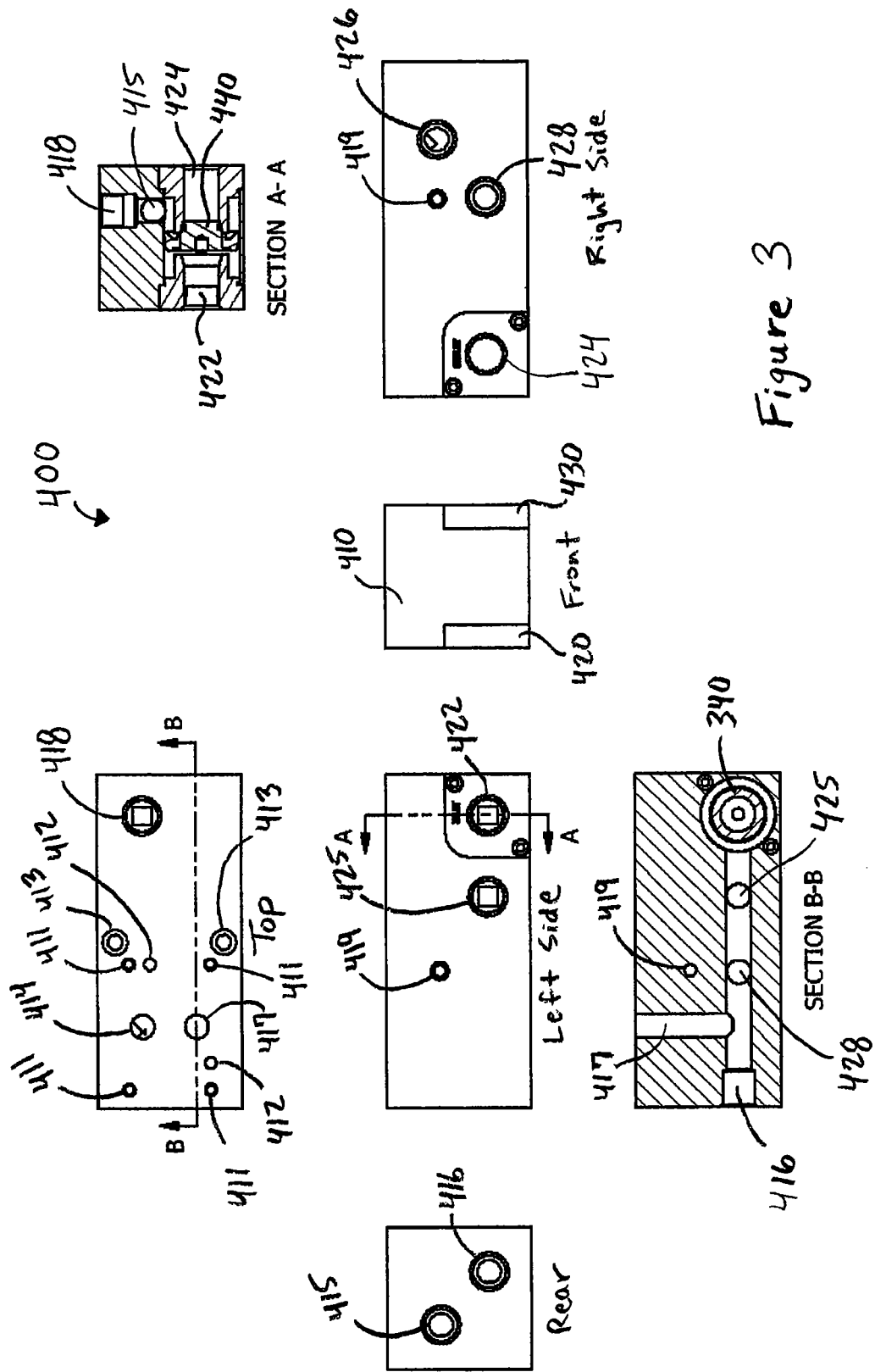
FIG. 3 illustrates a relief valve assembly according to one embodiment.

FIG. 3 illustrates a front, rear, top, right side, and left side view, including two cross sectional views A-A and B-B, of a relief valve assembly 400 according to one embodiment. The relief valve assembly 400 may be used as the first and/or second relief valve assemblies 70, 75 described herein. The relief valve assembly 400 includes a body 410, a first seat 420, and a second seat 430. The first and/or second seats 420, 430 may be removably secured to the body 410 for accessing a gate 440 that is movably disposed in the body 410 to control fluid communication therethrough. The body 410 may be provided with one or more mounting holes 411, 412, 413 for securing the relief valve assembly 400 within the housing 10 and/or to one or more components of the valve actuator control system 100. The body 410 may include a first fluid inlet 416 for receiving fluid from at least one of the pump assemblies 50, 55. Second and third fluid inlets 422, 425 (the second fluid inlet 422 being disposed through the first seat 420) may also be provided to receive fluid from the pump assemblies 50, 55. In one embodiment, one of the fluid inlets 416, 425, 422 may be used during operation of the valve actuator control system 100, while the other fluid inlets are plugged with one or more sealing members.

The body 410 may also include a first fluid outlet 415 for directing fluid to at least one of the first and second chambers 320, 330 to actuate the valve actuator 300. A second fluid outlet 418 may also be provided to direct fluid to at least one of the chambers 320, 330. In one embodiment, one of the fluid outlets 415, 418 may be used during operation of the valve actuator control system 100, while the other fluid outlet is plugged with one or more sealing members. During operation, fluid may flow through at least one of the fluid inlets 416, 422, 425 past the gate 440, and then through at least one of the fluid outlets 415, 418, via one or more fluid paths. While fluid is flowing through the relief valve assembly 400 to the valve actuator 300, the pressure in the body 410 forces the gate 410 to seal off communication with a first relief outlet 424, as illustrated in Section A-A. The first relief outlet 424 provides fluid communication to the fluid reservoir 40, to dump the fluid in the body 410 and the valve actuator 300 when desired during operation. A second relief outlet 428 may also be provided to quickly release fluid from the body 410 and the valve actuator 300. The second relief outlet 428 may include a fluid path that intersects the fluid path of the first inlet 416, as illustrated in Section B-B. The second relief outlet 428 may include an in-line relief valve to release fluid from the fluid paths to the fluid reservoir 40, in the event that the pressure in the body 410 exceeds a predetermined pressure. A pressure switch port 419 may be disposed through the body 410 and intersects the fluid path of the first fluid outlet 415. The pressure switch port 419 may be used as a means to communicate the pressure in the body 410 to at least one of the first and second transducers 80, 85. Using the pressure measured by the first and second transducers 80, 85 via the pressure switch port 419, the transducers 80, 85 may selectively control, e.g. turn on and off, the pump assemblies 50, 55 to actuate the actuator 300 as described herein.

Finally, the body 410 may include a fluid control outlet 417 that directs flow from the fluid path of the first fluid inlet 416 to at least one of the first and second control valve assemblies 60, 65. The body 410 may also include a fluid control inlet 414 that receives fluid from at least one of the first and second control valve assemblies 60, 65 that directs flow into the fluid path of the first fluid outlet 415. A second fluid control outlet 426 may be provided to release fluid from the body 410 and at least one of the first and second control valve assemblies 60, 65 to the fluid reservoir 40. When the first and second control valve assemblies 60, 65 are actuated to dump fluid pressure to the fluid reservoir 40, the pressure release in the fluid path of the first fluid inlet 416 and the back pressure in the fluid path of the first fluid outlet 415 may force the gate 440 from the position shown in Section A-A to a position where the fluid in the body 410 and the valve actuator 300 is quickly released to the fluid reservoir 40. In this manner, a first relief valve assembly 400 may be used to supply and maintain fluid in one of the chambers 320, 330 of the valve actuator 300, while a second relief valve assembly 400 is used to quickly release and dump fluid from the other chamber of the valve actuator 300 to the fluid reservoir 40.

In one embodiment, the first and second transducers 80, 85 may include pressure sensors operable sense the pressure in the fluid circuits of the valve actuator control system 100. The pressure sensors may be configured to start and/or stop the first and second pump assemblies 50, 55, respectively, when the pressure in the fluid circuits and/or valve actuator 300 reaches a pre-determined and/or pre-set pressure. The pressure sensors may be in communication with the first and second pump assemblies 50, 55 directly and/or via the controller assembly 30. In one embodiment, the first and second transducers 80, 85 may include one or more gauges that can be visually inspected to monitor the pressure in the fluid circuits of the valve actuator control system 100.

In one embodiment, the indication device 90 may include an intrinsically safe, light-emitting diode (LED) assembly configured to provide a visual indication corresponding to the position of the valve 350. The indication device 90 may include a first indicator 91, a second indicator 92, and a third indicator 93 that communicate a visual signal to an operator located at a remote location relative to the control valve system 100 corresponding to a position of the valve 350. In one embodiment, the first indicator 91 may be a green lit LED that provides a green light when the valve 350 is in the open position. In one embodiment, the second indicator 92 may be a yellow lit LED that provides a yellow light when the valve 350 is transitioning between the open and closed position. In one embodiment, the third indicator 93 may be a red lit LED that provides a red light when the valve 350 is in the closed position. The LED lights may be continuous or flashing. In one embodiment, the indication device 90 may be configured to provide an auditory signal to an operator remote from the location of the control valve system 100 corresponding to a position of the valve 350.

In one embodiment, the valve actuator 300 may be a (balanced or unbalanced stem) double acting valve actuator having a housing 310, a first pressure chamber 320, a second pressure chamber 330, and a piston disposed within the housing 310 between the pressure chambers. Pressurization of the first pressure chamber 320 moves the piston in a first direction, and pressurization of the second pressure chamber 330 moves the piston in a second direction that is opposite the first direction. In one embodiment, only a minimal pressure differential, in a range of about 30 psi to about 40 psi, between the first and second chambers 320, 330 may be required to move the piston. The valve actuator 100 may also include a valve stem connected to the piston at a first end and connected to the valve 350 at a second end to position the valve 350 in an open and closed position upon pressurization of the pressure chambers. Another valve stem may be connected to the piston that extends through the housing 310 to provide a visual indication of the position of the valve actuator 300 and valve 350. The additional valve stem extending from the housing 310 may also be used to manually actuate the valve actuator 300. In one embodiment, in the event of a failure, the valve actuator 300 may be configured to "fail-as-is," fail in a closed position, or fail in an open position. Other types of valve actuators and valves known in the art may be used with the embodiments described herein.

In one embodiment, the first control valve assembly 60 and the first relief valve assembly 70 may be integrated into a single manifold system that is in communication with the first pump assembly 50 and the first chamber 320. The integrated manifold system may have a single exhaust fluid circuit to return fluid from the first chamber 320 to the fluid reservoir 40. The second control and relief valve assemblies 65 and 75 may be similarly combined.

In one embodiment, the valve actuator control system 100 is operable to direct pressurized fluid to the first chamber 320 from the second chamber 330 of the valve actuator 300 upon receiving a signal from the remote control device 200, thereby opening the valve 350. The valve actuator control system 100 is also operable to direct pressurized fluid from the first chamber 320 to the second chamber 330 of the valve actuator 300 upon receiving a signal from the remote control device 200, thereby closing the valve 350. A single remote control device 200 may be configured to operate one or more valve actuator control systems 100, which may be configured to operate one or more valve actuators 300, which may be configured to operate one or more valves 350. The valve actuator control system 100 may be operable to actuate the valve actuator 300 multiple times per day via the remote control device 200.

Pressurization of the first chamber 320 via a first fluid circuit comprising conduits 41, 51, 61, and 71 that is in communication with the fluid reservoir 40 (and the second chamber 330) may actuate the valve actuator 300 to open the valve 350. Fluid pressure in the first chamber 320 may be discharged into the fluid reservoir 40 via a quick relief circuit comprising conduit 45 that is in communication with the first fluid circuit. Fluid pressure in the first fluid circuit may also be discharged into the fluid reservoir 40 via an exhaust circuit comprising conduit 43 that is in communication with the first fluid circuit. The first pump assembly 50, the first control valve assembly 60, the first relief valve assembly 70, and the first transducer 80 are in communication with the first fluid circuit to deliver and relieve pressurized fluid to and from the first chamber 320 of the valve actuator 300.

Pressurization of the second chamber 330 via a second fluid circuit comprising conduits 42, 56, 66, and 76 that is in communication with the fluid reservoir 40 may actuate the valve actuator 300 to close the valve 350. Fluid pressure in the second chamber 330 may be discharged into the fluid reservoir 40 via a quick relief circuit comprising conduit 46 that is in communication with the second fluid circuit. Fluid pressure in the second fluid circuit may also be discharged into the fluid reservoir 40 via an exhaust circuit comprising conduit 44 that is in communication with the second fluid circuit. The second pump assembly 55, the second control valve assembly 65, the second relief valve assembly 75, and the second transducer 85 are in communication with the second fluid circuit to deliver and relieve pressurized fluid to and from the second chamber 330 of the valve actuator 300.

To describe a first operation of the valve actuator control system 100, assume that the valve 350 is in a closed position. When the valve 350 is in the closed position, the second chamber 330 is pressurized. The second control valve assembly 65 maintains pressure in the conduit 66, which closes the second relief valve assembly 75. The second relief valve assembly 75 maintains pressure in the conduit 76 and thus in the second chamber 330, thereby maintaining the valve 350 in the closed position. The second transducer 85 is operable to monitor the pressure in the conduit 76 and thus in the second chamber 330. In the event that the pressure in the second chamber 330 falls below a pre-determined pressure setting (e.g. due to a loss of fluid) the second transducer 85 may actuate the second pump assembly 55 to provide additional pressurized fluid from the fluid reservoir 40 to the second chamber 330 to maintain the pressure in the second chamber 330 at or above the pre-determined pressure setting.

When it is desired to open the valve 350, an operator may transmit a signal from a remote location, such as a wired and/or wireless location up to 200 feet to 300 feet away and/or several miles away, using the remote control device 200 to the valve actuator control system 100 to actuate the valve actuator 300 to open the valve 350. The signal may be generated by operating the remote control device 200. The signal may be received by the receiver 15 and communicated to the controller assembly 30, and/or may be directly received by the controller assembly 30. Upon receiving the signal, the controller assembly 30 may actuate the second control valve assembly 65 to relieve the pressure in the conduits 56 and 66 via the exhaust circuit, i.e. conduit 44, to the fluid reservoir 40. The pressure drop in the conduit 66 will then actuate the second relief valve assembly 75 to quickly relieve the fluid pressure in the conduit 76 and in the second chamber 330 via the quick relief circuit, i.e. conduit 46. Upon receiving the signal, the controller assembly 30 may also prevent the second transducer 85 from actuating the second pump assembly 55.

During the discharge of pressurized fluid from the second chamber 330, the controller assembly 30 may actuate the first pump assembly 50 and/or the first control valve assembly 60 to direct pressurized fluid from the fluid reservoir 40 to the first chamber 320 of the valve actuator 300. As the first chamber 320 is pressurized, the valve actuator 300 begins to move the valve 350 from the closed position to the open position. The controller assembly 30 may also activate the first transducer 80 to monitor the pressure in the conduit 71 and thus in the first chamber 320. When the pressure in the first chamber 320 reaches a pre-determined pressure, the first transducer 80 is operable to turn off the first pump assembly 50, directly and/or via the controller assembly 30. The first control valve assembly 60 maintains pressure in the conduit 61, which closes the first relief valve assembly 70. The first relief valve assembly 70 maintains pressure in the conduit 71 and thus in the first chamber 320, thereby maintaining the valve 350 in the open position. The first transducer 80 is operable to continuously monitor the pressure in the conduit 71 and thus in the first chamber 330. In the event that the pressure in the first chamber 320 falls below a pre-determined pressure setting (e.g. due to a loss of fluid) the first transducer 80 may actuate the first pump assembly 50 to provide additional pressurized fluid from the fluid reservoir 40 to the first chamber 320 to maintain the pressure in the first chamber 320 at or above the pre-determined pressure setting.

When it is desired to close the valve 350, the operator may transmit a signal via the remote control device 200 to the valve actuator control system 100 to actuate the first control valve assembly 60 to relieve the pressure in the conduits 51 and 61 via the exhaust circuit, i.e. conduit 43, to the fluid reservoir 40. The pressure drop in the conduit 61 will then actuate the first relief valve assembly 70 to quickly relieve the fluid pressure in the conduit 71 and in the first chamber 330 via the quick relief circuit, i.e. conduit 45. The controller assembly 30 may also prevent the first transducer 80 from actuating the first pump assembly 50. During the discharge of pressurized fluid from the first chamber 320, the controller assembly 30 may actuate the second pump assembly 55 and/or the second control valve assembly 65 to direct pressurized fluid from the fluid reservoir 40 to the second chamber 320 to move the valve 350 from the open to the closed position. The controller assembly 30 may also activate the second transducer 85 to continuously monitor the pressure in the conduit 76 and turn the second pump assembly 55 off or on when the pressure in the second chamber 330 reaches or is below a pre-determined pressure, as stated above. The second control valve assembly 65 maintains pressure in the conduit 66, which closes the second relief valve assembly 75 and maintains pressure in the conduit 71 and thus in the second chamber 330, thereby maintaining the valve 350 in the closed position.

The indication device 90 may also be operable using the controller assembly 30 to indicate when the valve 350 is in the open position, the closed position, and transitioning between the open and closed positions. In one embodiment, indication device 90 may provide a solid green light via indicator 91 to signal that the valve 350 is in the open position. In one embodiment, indication device 90 may provide a solid red light via indicator 93 to signal that the valve 350 is in the closed position. In one embodiment, indication device 90 may provide a blinking yellow light via indicator 92 to signal that the valve 350 is moving between the open and closed positions. During operation of the valve actuator control system 100, the controller assembly 30 may continuously communicate the status of the valve 350 to the indication device 90.

Figure 2:
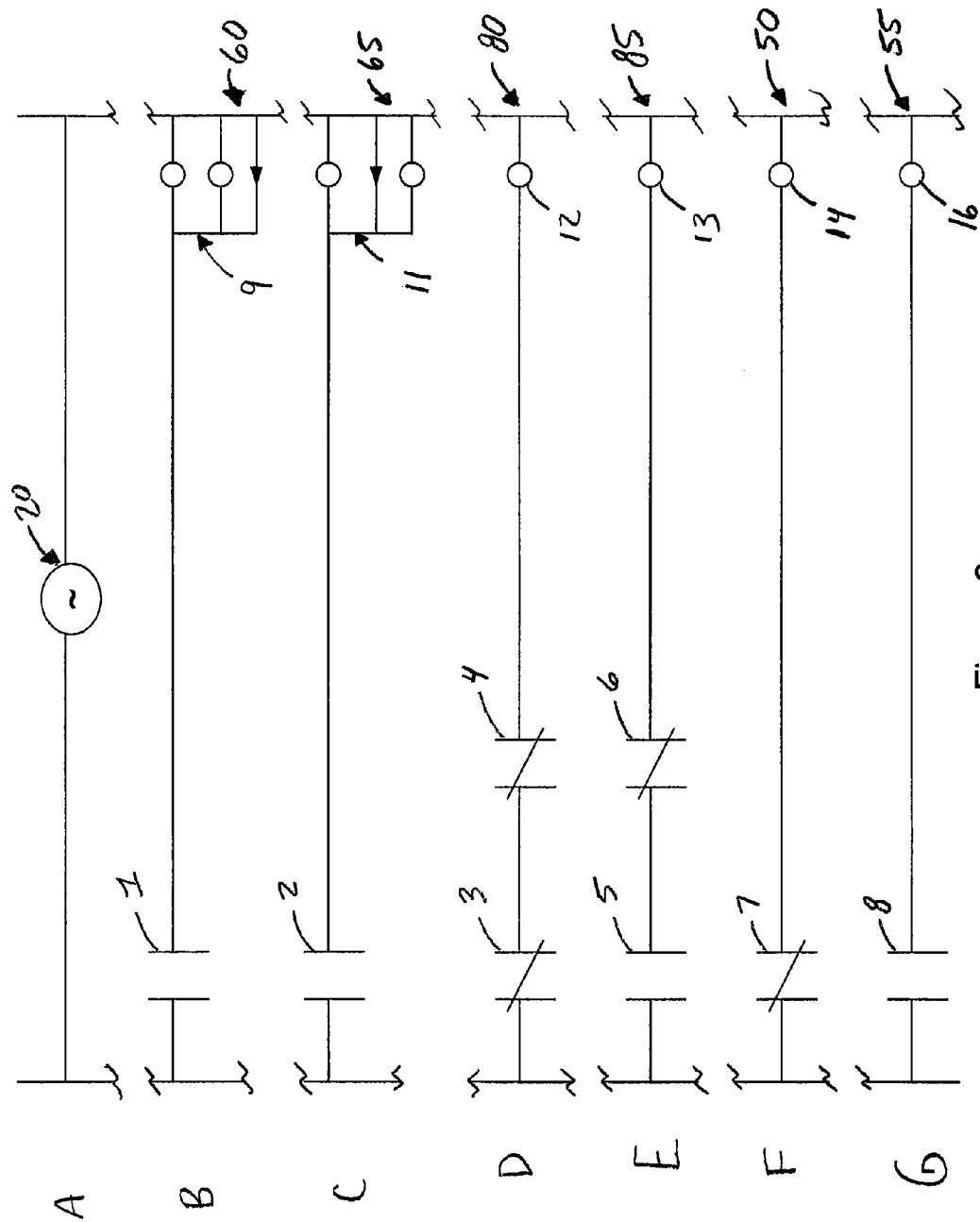
FIG. 2 illustrates a schematic of the valve actuator control system according to one embodiment.

FIG. 2 illustrates a schematic view of the controller assembly 30 of the valve actuator control system 100 according to one embodiment. FIG. 2 illustrates "Rungs" A through G of a parallel control circuit that represent the opening and closing of the electrical contacts between the various components of the valve actuator control system 100. Rung A illustrates the power source 20. The remote control device 200 may transmit a signal to the controller assembly 30 to active an on/off switch connected to the power source 20, to communicate power from the power source 20 to Rungs B through G as described below.

Rungs B and C may represent a "latching" relay that is operable to open and close the first and second control valve assemblies 60, 65, which may be solenoid-type valves. The latching relay may remain in position in the absence of power, and may be moved from one position to another position when activated. As illustrated, the first control valve assembly 60 is actuated into a closed position and the second control valve assembly 65 is actuated into an open position. When in these positions, the valve actuator control system 100 is directing fluid pressure to the first chamber 320 via the first fluid circuit (conduits 41, 51, 61, 71) and relieving fluid pressure from the second chamber 330 via the exhaust circuit (44) and the quick relief circuit (46) as described above. The lathing relay maintains the first and second control valves 60, 65 in these positions until re-activated to switch positions. Rungs B and C may include momentary relays and/or contacts 1, 2 configured to communicate power to relays and/or contacts 9, 11 to actuate the first and second control valve assemblies 60, 65.

Rungs D and E may represent low-amp relays that are in communication with the first and second transducers 80, 85. As illustrated, the first transducer 80 is activated to actuate the first pump assembly 50. In particular, the low-amp relay of Rung D provides an electrical connection to actuate a high-amp relay represented by Rung F to turn the first pump assembly 50 on, and thereby direct pressurized fluid from the fluid reservoir 40 to the first chamber 320. As illustrated, the second transducer 85 is de-activated to prevent actuation of the second pump assembly 55. In particular, the low-amp relay of Rung E prevents the electrical connection necessary to actuate a high-amp relay represented by Rung G that turns the second pump assembly 55 on, when desired to direct pressurized fluid from the fluid reservoir 40 to the second chamber 330. Rungs D and E may include relays and/or contacts 3, 4 and 5, 6, respectively, that are configured to communicate power to relays and/or contacts 12, 13 to actuate the first and second transducers 80, 85, respectively. Rungs F and G may include relays and/or contacts 7 and 8, respectively, that are configured to communicate power to relays and/or contacts 14, 16 to actuate the first and second pump assemblies 50, 55, respectively. The remote control device 200 may transmit a signal to the valve actuator control system 100 to open and close the various relays, thereby controlling actuation of the pump assemblies 50, 55, the control valve assemblies 60, 65, the relief valve assemblies 70, 75, and the transducers 80, 85 to actuate the valve actuator 300 as described herein.

Figure 4:
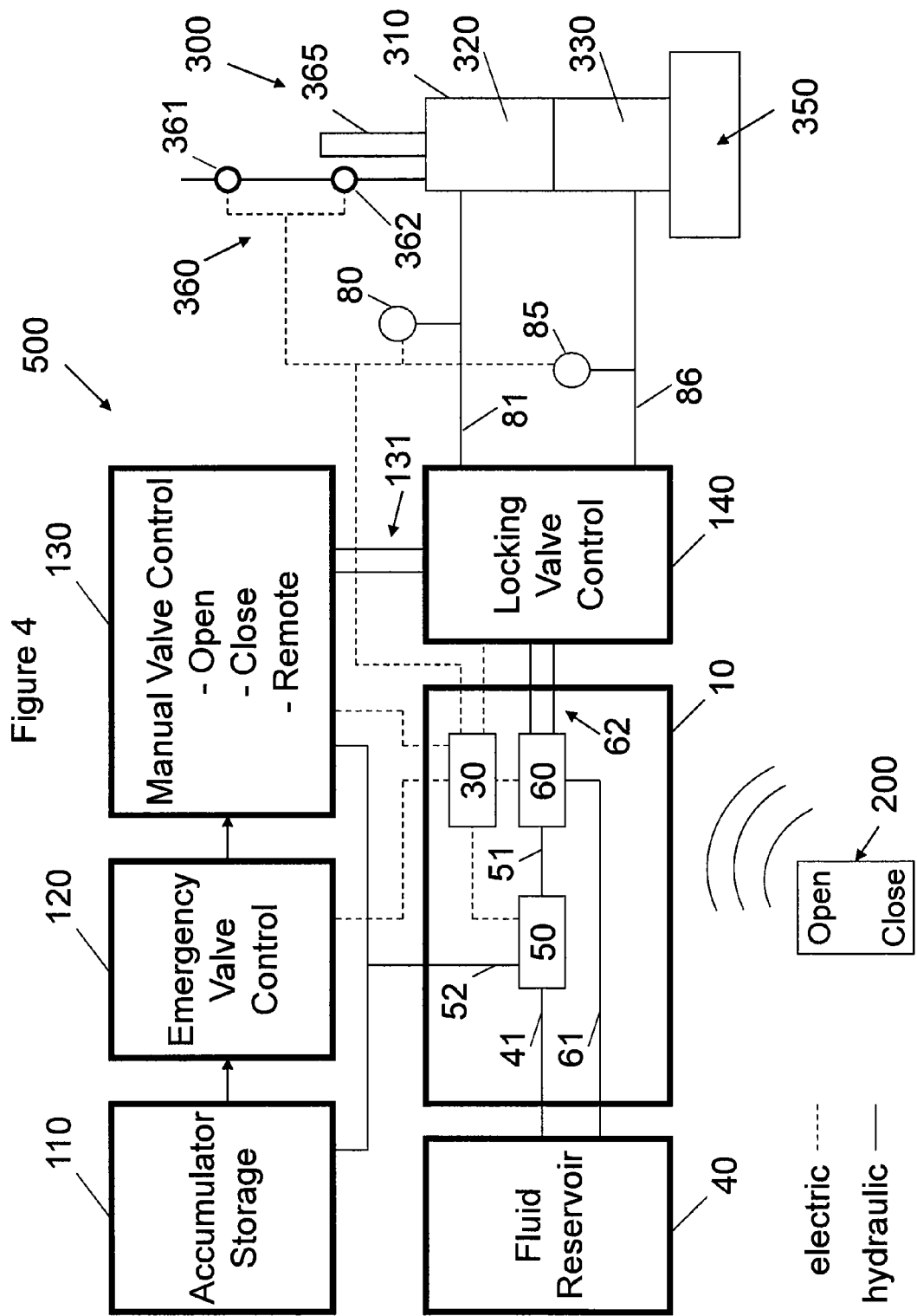
FIG. 4 illustrates a valve actuator control system according to one embodiment.

FIG. 4 illustrates a valve actuator control system 500 for operating the valve actuator 300 according to one embodiment. The embodiments of the valve actuator control system 100 illustrated in FIG. 1 and described herein may be used with the embodiments of the valve actuator control system 500 illustrated in FIG. 4, and vice versa. The valve actuator control system 500 is comprised of many of the components of the valve actuator control system 100. Similar components of the control systems 100 and 500 are referred to herein using the same reference numerals, and a full description of each component will not be repeated for brevity. Some of the components, such as the power source 20, the receiver 15, the indication device 90, and various sensors/transducers, may be used with the valve actuator control system 500 but have been omitted for clarity.

The valve actuator control system 500 may include the housing 10 containing the controller assembly 30, the pump assembly 50, and the control valve assembly 60. The control valve assembly 60 may also be operable as the first relief valve assembly 70 as described above with respect to the valve actuator control system 100. The fluid reservoir 40 may be disposed adjacent to and/or exterior from the housing 10 for storing and supplying the fluid for actuation of the valve actuator 300. One or more fluid lines, such as conduits 41, 61, may be provided to supply and return fluid between the fluid reservoir 40, the pump assembly 50, and/or the control valve assembly 60.

The valve actuator control system 500 may be remotely operated via the remote control device 200 upon receiving a signal from an operator to actuate the valve actuator 300 to open and close the valve 350. The signal from the remote control device 200 may be communicated to the controller assembly 30 to operate the valve actuator control system 500 similarly as described above with respect to the valve actuator control system 100. The controller assembly 30 may actuate the pump assembly 50 to direct fluid from the fluid reservoir 40 to one of the chambers 320, 330 of the valve actuator 300, while fluid is returned to the fluid reservoir 40 from the other one of the chambers 320, 330. In one example, fluid may be supplied through fluid conduits 41, 51, 62, 81 to the first chamber 320, while fluid is returned from the second chamber 330 through fluid conduits 86, 62, 61 to the fluid reservoir 40. In one example, fluid may be supplied through fluid conduits 41, 51, 62, 86 to the second chamber 330, while fluid is returned from the first chamber 330 through fluid conduits 81, 62, 61 to the fluid reservoir 40. The control valve assembly 60 and/or the locking valve control 140 may be operable by the controller assembly 30, and may be used to direct fluid communication through the valve actuator control system 500. In one embodiment, the control valve assembly 60 may include one or more electrically controlled valves (such as solenoid valves), a 4-way/3-position control valve, double pilot operated check valves, one or more pressure relief valves, one or more pressure switches, and/or a manifold or fluid line connection.

In addition to remote operation, the valve actuator control system 500 may include an emergency valve control 120, a manual valve control 130, and/or a locking valve control 140.

In the event of a loss or shutdown of one or more components of the valve actuator control system 500, such as the pump assembly 50, the valve 350 may be actuated using pressurized fluid that is stored and supplied by an accumulator storage 110, which is controlled by the emergency valve control 120. The emergency valve control 120 may be a manually and/or remotely operated valve assembly that may communicate fluid from the accumulator storage 110 to the valve actuator 300. The accumulator storage 110 may include one or more (nitrogen) accumulator bottles for storing and supplying a sufficient amount of fluid to actuate or stroke the valve 350 at least four or more times. In one embodiment, the accumulator storage 110 may be pre-charged to a desired pressure using the pump assembly 50. The emergency valve control 120 may be in communication with the controller assembly 30 to coordinate the operation of one or more of the other components during operation using the emergency valve control 120.

During on-site operation, the valve actuator control system 500 may be operated using the manual valve control 130. The manual valve control 130 may include a manually operated handle or lever to select an "open", "close", or "remote" operating position. When the manual valve control 130 is moved to the open position or the closed position, the manual valve control 130 may initiate operation of the pump assembly 50 to supply and/or return fluid through the one or more fluid conduits 41, 52, 131, 81, 86, 62, 61 to and/or from the valve actuator 300. The manual valve control 120 may be in communication with the controller assembly 30 to coordinate the operation of one or more of the other components during operation using the manual valve control 120. For example, the manual valve control 130 may override the control valve assembly 60 to direct fluid though the valve actuator control system 500 as necessary. When the manual valve control 130 is moved to the remote operation position, the valve actuator control system 500 is operable under the remote/automatic control regime. In one embodiment, the manual valve control 130 may include one or more hydraulic pumps, double pilot operated check valves, one or more pressure relief valves, one or more pressure switches, and/or a manifold or fluid line connection.

The valve actuator control system 500 may finally be operated using the locking valve control 140. The locking valve control 140 may be a manually and operated valve assembly that may control fluid communication to the valve actuator 300. The locking valve control 140 may be operable to open and close (allow and prevent) fluid communication to the valve actuator 300 from the control valve assembly 60, the manual valve control 130, and the emergency valve control 120. The locking valve control 140 may include a manually operated handle or lever to select an "unlocked" or "locked" operating position. When the locking valve control 140 is moved to the unlocked position, fluid communication to the valve actuator 300 is open, and when the locking valve control 140 is moved to the locked position, fluid communication to the valve actuator 300 is closed. The locking valve control 140 may be in communication with the controller assembly 30 to coordinate the operation of one or more of the other components during operation using the locking valve control 140. In one embodiment, the locking valve control 140 may include one or more electrically controlled valves (such as solenoid valves), a 4-way/3-position control valve, double pilot operated check valves, one or more pressure relief valves, one or more pressure switches, and/or a manifold or fluid line connection.

A valve indicator 360 comprising a first transducer 361 and a second transducer 362, such as proximity sensors, may be coupled to the housing 310 of the valve actuator 300. The valve indicator 360 may be operable to measure or sense the position of the valve shaft 365, and communicate the position to the controller assembly 30. For example, when the valve 350 is moved to the closed position, the second transducer 362 is operable to generate a signal indicating that the shaft 365 is within a pre-determined distance (proximity) relative to the second transducer 362, while the first transducer 361 generates a signal indicating that the shaft 365 is outside of a pre-determined distance (proximity) relative to the first transducer 361. The measurements of the first and second sensors 361, 362 may provide an indication and confirmation that the valve 350 is in the closed position. When the valve 350 is moved to the open position, the shaft 365 may be raised to a position where it is within the pre-determined distances of both the first and second transducers 361, 362, thereby providing an indication and confirmation that the valve 350 is in the open position. The measured position of the valve 350 can be communicated to an operator at a remote location via the controller assembly 30.

In one embodiment, the valve actuator control system 500 may include the appropriate software and a touch-screen device for monitoring and controlling the operation of the valve actuator and the valve 350. The touch-screen device may display the status of the valve actuator 300 and the valve 350 using one or more color indicators, such as green for open, yellow for neutral, and red for closed. The touch-screen device may be enabled with a one-push button control to open and close the valve actuator and the valve 350. The touch-screen device may also display one or more measured characteristics, such as the opening and closing pressure and force of the valve actuator 300 and the valve 350.

In one embodiment, transducers 80, 85 are operable to measure the fluid pressure within the fluid conduits 81, 86 that direct fluid to the chambers 320, 330 of the valve actuator 300. The transducers 80, 85 may continuously monitor and measure the fluid pressure to determine both the pressure and force (thrust) necessary to actuate the valve 350 to the open and closed positions. During the life of the valve 350, debris or other abrasive material may begin to collect and buildup within the valve 350, thereby increasing drag on the gate of the valve 350 during operation. The increased drag or friction may also cause the pressure and force necessary to move the valve 350 to the open and/or closed position to increase. The increase in pressure and force as measured by the transducers 80, 85 may be communicated to an operator via the controller assembly 30 so that remedial actions may be taken before premature or excessive wear/damage to the valve 350 occurs. The pressure and force measurements as measured by the transducers 80, 85 may also be used to prevent premature rework or reconditioning of the valve 350 before it is necessary so as to maximize the work life of the valve 350. In one embodiment, the valve actuator 300 may be rated for about 1500 psi to about 3000 psi operating pressure.

The valve actuator control systems 100, 500 provide numerous advantages, which include but are not limited to, durability to withstand harsh environments, compact size (small footprint), self contained (e.g. battery-powered), operating redundancy, and remote communication of operating characteristics.

While the foregoing is directed to embodiments of the invention, other and further embodiments of the invention may be devised without departing from the basic scope thereof, and the scope thereof is determined by the claims that follow.

The invention claimed is:

1. A valve actuator control system for use with a valve actuator, comprising:
   a first pump assembly;
   a second pump assembly;
   a first control valve assembly in fluid communication with the first pump assembly;
   a first relief valve assembly configured to open and close fluid flow between the first control valve assembly and the valve actuator;
   a second control valve assembly in fluid communication with the second pump assembly;
   a second relief valve assembly configured to open and close fluid flow between the second control valve assembly and the valve actuator;
   a fluid reservoir in communication with the first pump assembly, the second pump assembly, the first control valve assembly, the second control valve assembly, the first relief valve assembly, and the second relief valve assembly via one or more fluid circuits; and
   a controller assembly operable to actuate the first pump assembly or the second pump assembly via one or more relays to direct fluid from the fluid reservoir to the valve actuator via the one or more fluid circuits, and operable to actuate the first control valve assembly or the second control valve assembly via one or more relays to direct fluid from the valve actuator to the fluid reservoir via the one or more fluid circuits.

2. The system of claim 1, further comprising a remote control device operable to control the controller assembly via wired or wireless communication.

3. The system of claim 2, wherein the remote control device is operable to select the first or second pump assembly via the controller assembly to direct fluid from the reservoir to the valve actuator.

4. The system of claim 2, wherein the remote control device is operable to select the first or second control valve assembly via the controller assembly to direct fluid from the valve actuator to the fluid reservoir.

5. The system of claim 1, further comprising an explosion proof housing for enclosing the first and second pump assemblies, the first and second control valve assemblies, the fluid reservoir, and the controller assembly.

\* \* \* \* \*